US007620683B2

(12) United States Patent
Maehiro

(10) Patent No.: US 7,620,683 B2
(45) Date of Patent: Nov. 17, 2009

(54) TERMINAL DEVICE, INFORMATION VIEWING METHOD, INFORMATION VIEWING METHOD OF INFORMATION SERVER SYSTEM, AND RECORDING MEDIUM

(75) Inventor: Kazutoyo Maehiro, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 603 days.

(21) Appl. No.: 10/107,132

(22) Filed: Mar. 28, 2002

(65) Prior Publication Data

US 2002/0198949 A1 Dec. 26, 2002

(30) Foreign Application Priority Data

May 18, 2001 (JP) ............................. 2001-149769

(51) Int. Cl.
*G06F 15/16* (2006.01)
*A63F 13/12* (2006.01)

(52) U.S. Cl. ........................................ 709/204; 463/42
(58) Field of Classification Search ................ 703/206; 709/204–207, 219, 246, 203; 715/753; 463/40–42, 463/9

See application file for complete search history.

(56) References Cited

U.S. PATENT DOCUMENTS

| 5,063,508 | A |   | 11/1991 | Yamada et al. |
| 5,884,248 | A | * | 3/1999  | Hall ............................. 704/8 |
| 5,966,691 | A | * | 10/1999 | Kibre et al. ................ 704/260 |
| 6,061,821 | A | * | 5/2000  | Schlosser ................... 714/752 |
| 6,161,082 | A | * | 12/2000 | Goldberg et al. ............... 704/3 |
| 6,175,873 | B1 |   | 1/2001  | Yamane et al. |
| 6,189,045 | B1 | * | 2/2001  | O'Shea et al. ............. 709/246 |
| 6,205,342 | B1 | * | 3/2001  | Oakes et al. ................ 455/566 |
| 6,219,641 | B1 | * | 4/2001  | Socaciu ...................... 704/251 |
| 6,640,230 | B1 | * | 10/2003 | Alexander et al. ............ 707/10 |
| 6,702,676 | B1 | * | 3/2004  | Ota et al. ...................... 463/41 |
| 6,775,663 | B1 | * | 8/2004  | Kim .............................. 707/3 |
| 7,203,908 | B1 | * | 4/2007  | Nakajima et al. ........... 715/758 |
| 2002/0059379 | A1 | * | 5/2002 | Harvey et al. ............... 709/205 |

FOREIGN PATENT DOCUMENTS

| EP | 0532338  | 3/1993  |
| EP | 0686949  | 12/1995 |
| EP | 1031912  | 8/2000  |
| JP | 4-1852   | 1/1992  |
| JP | 10164127 | 6/1998  |
| JP | 10-187689| 7/1998  |
| JP | 10271159 | 10/1998 |

(Continued)

OTHER PUBLICATIONS

English language Abstract for JP 10-164127, Jun. 19, 1998.

(Continued)

*Primary Examiner*—Aaron Strange
(74) *Attorney, Agent, or Firm*—Greenblum & Bernstein, P.L.C.

(57) ABSTRACT

The present invention enables restriction of content of information in a message, which has been prepared by a user and is provided in an information service system for the viewing by a group of users, in accordance with a use purpose. The message information is prepared by selecting and combining words from a word group prepared in advance. The information for viewing is prepared by a game device.

14 Claims, 9 Drawing Sheets

FOREIGN PATENT DOCUMENTS

| | | |
|---|---|---|
| JP | 11-8650 | 1/1999 |
| JP | 11143616 | 5/1999 |
| JP | 11146460 | 5/1999 |
| JP | 11154974 | 6/1999 |
| JP | 11168496 | 6/1999 |
| JP | 11-261629 | 9/1999 |
| JP | 2000-176168 | 6/2000 |
| WO | 00/69140 | 11/2000 |

OTHER PUBLICATIONS

English language Abstract and a partial English language translation for JP 10-271159, Oct. 9, 1998.
English language Abstract for JP 11-8650, Jan. 12, 1999.
English language Abstract and partial English language translation for JP 11-143616, May 28, 1999.
English language Abstract for JP 11-146460, May 28, 1999.
English language Abstract for JP 11-154974, Jun. 8, 1999.
English language for JP 11-168496, Jun. 22, 1999.
English language Abstract for JP 2000-176168, Jun. 27, 2000.
English Language Abstract of JP10-187689.
English Language Abstract of JP11-261629.
English Language Abstract of JP4-1852.

\* cited by examiner

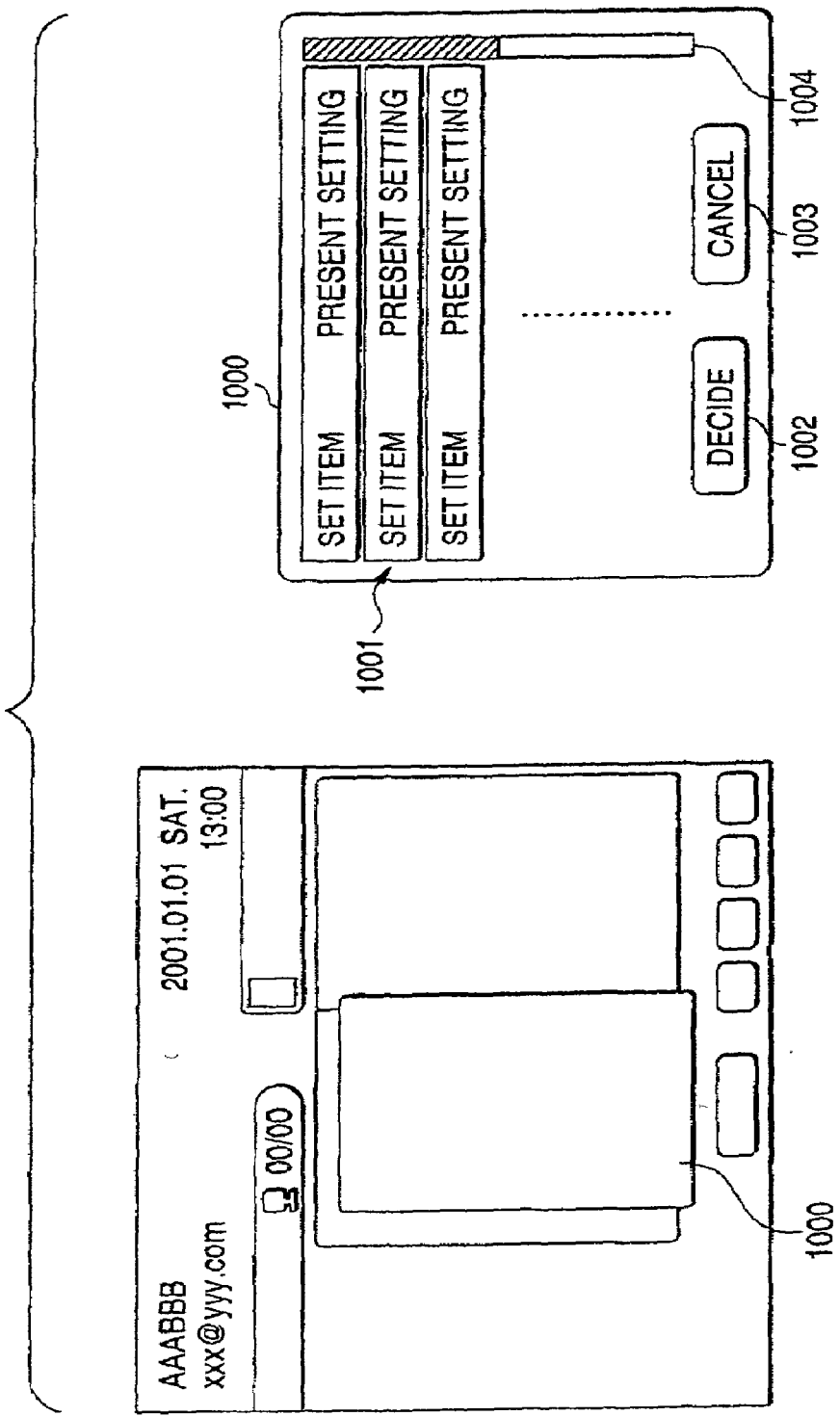

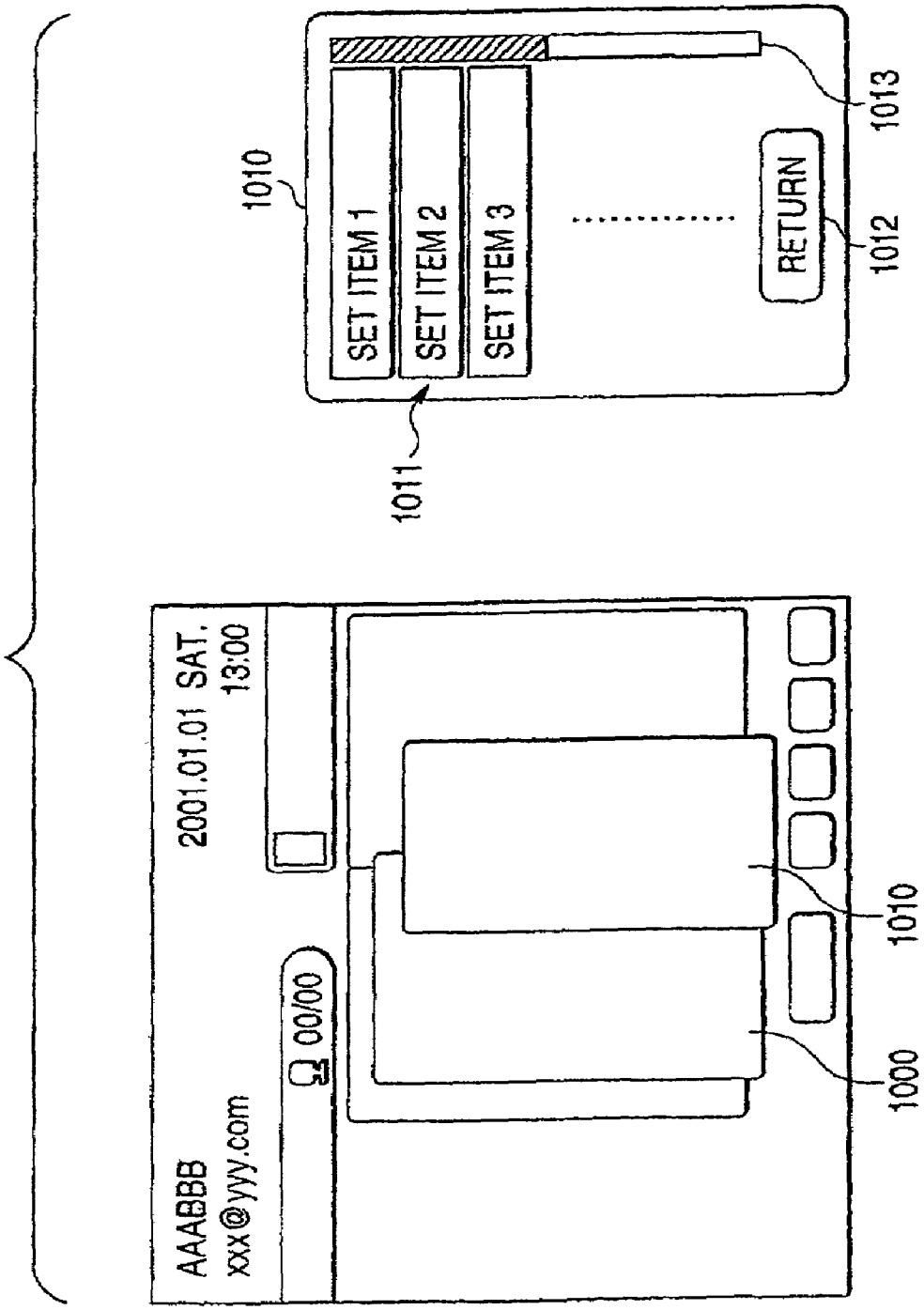

TERMINAL DEVICE, INFORMATION VIEWING METHOD, INFORMATION VIEWING METHOD OF INFORMATION SERVER SYSTEM, AND RECORDING MEDIUM

CROSS REFERENCE TO RELATED APPLICATION

The present disclosure relates to subject matter contained in Japanese Patent Application No. 2001-149769, filed on May 18, 2001, the disclosure of which is expressly incorporated herein by reference in its entirety.

BACKGROUND OF THE INVENTION

1. Field of the Invention

The present invention relates to a terminal device for reading message information of a user in a memory area, assigned to a specific user, in a communication server system by a group of terminal devices and for displaying the read message information in the terminal device of another user. The present invention also relates to a viewing method of the terminal device, an information viewing method of an information service system, and a recording medium.

2. Related Art

In the prior art, there is well known an information service system for providing various kinds of information services to terminals connected therewith. A membership information service system provides information services, in which self-introductions of members and guides of home pages prepared by members are entered and the above user-related guidance information can be viewed from terminals so as to enhance the friendships between the members.

In the information services, when a user registers a guide message in advance from a terminal, the guide message to be registered is stored in a specific storage area in the information service system.

In case the message information restricted to a specific application, such as an absence notification of a user, is opened to other users by using such information viewing function, there arises the following drawbacks.

As the information to be viewed is prepared by a user, guide information other than a specific application may be prepared and entered. For only notifying an absence, for example, advertisement of prizes or companies may be entered. In order to avoid this situation, the information services company has to confirm all pieces of entered information visually. Moreover, the problem of invasion of privacy may also occur even if the information is viewed.

SUMMARY OF THE INVENTION

Therefore, the object of the present invention is to provide a terminal device, which can make use of the message information easily and effectively, an information viewing method of the terminal device, an information viewing method of an information service system, and a recording medium.

In order to achieve this object, according to one embodiment of the invention, there is provided a terminal device for registering message information of a user. The terminal device is used in an information service system for storing the message information in a storage area and for allowing viewing of the message information in response to an instruction of another user. The terminal device includes a storage system that stores multiple words, a display system that displays the words stored in the storage system, and a selecting system that selects an arbitrary word from the displayed words. The terminal device further includes a user's message information processor that prepares the message information of the user to be registered in the storage area, by combining the selected words. The terminal device further includes a message information transmitter that transmits the prepared message information to the information service system to instruct a registration in the storage area of the information service system.

In the terminal device, it is desirable that the message information of the user is an absence notification.

In the terminal device, moreover, it is also desirable that the words are displayed as being classified by their types.

In the terminal device, moreover, identification codes associated with meanings may be assigned to the words, and the words are displayed in a letter series mode. Also, the information processor may prepare the message information of the user by converting the selected word into the identification codes.

According to another embodiment of the invention, there is provided a terminal device for viewing message information of a user. The terminal device may be used in an information service system for allowing viewing of the message information, which is registered in a storage area by the user, in response to instruction of another user. The terminal device includes an acquiring system that acquires, from the storage area, the message information in an identification code series mode, prepared by the user, and a converting system that converts the acquired message information of the user into a character code series. The terminal device further includes a display system that displays the converted character code series into a character mode.

In the terminal device, the information service system may convert the message information of the user in the identification code series mode registered from the terminal device, into the message information of the user in the character code series mode. According to another embodiment of the invention, there is provided, an in formation registering method of a terminal device for registering message information of a user. The method is used in an information service system for storing the message information of the user in a storage area and for allowing viewing of the message information in response to an instruction of another user. The method includes storing a group of words in a storage device in the terminal device, displaying the words stored in the storage device, and selecting an arbitrary word from the displayed words. The method further includes preparing the message information of the user to be registered in the storage area, by combining the selected words, and transmitting the prepared message information to the information service system to instruct a registration in the storage area of the information service system.

In the information registering method of the terminal device, the message information of the user may be an absence notification. In the information registering method of the terminal device, moreover, the words may be displayed as being classified by their types.

In the information registering method of the terminal device, identification codes associated with meanings may be assigned to the words. Furthermore, the words may be displayed in a character series mode, and the message information of the user may be prepared by converting the selected word into the identification codes.

According to another embodiment of the invention, there is provided an information viewing method of a terminal device for viewing message information of a user. The method is used in an information service system for allowing viewing of the message information registered in a storage area by the user, in response to an instruction of another user. The method includes acquiring the message information in an identification code series mode, prepared by the user, from the storage area. The method further includes converting the acquired message information of the user into a character code series and displaying the converted character code series into a character mode.

In the information viewing method of the terminal device, the information service system may convert the message information of the user in the identification code series mode registered from the terminal device into the message information of the user in the character code series mode.

According to another embodiment of the invention, there is provided a recording medium on which is recorded a program executed by a terminal device for registering message information of a user. The recording may be used in an information service system for storing the message information of the user in a storage area and for allowing viewing of the message information in response to an instruction of another user. The program causes the terminal device to store a group of words in advance in a storage device in the terminal device, display the words stored in the storage device, and select an arbitrary word from the displayed words. The program further causes the terminal device to prepare the message information of the user to be registered in the storage area, by combining the selected words. The program further causes the terminal device to transmit the prepared message information to the information service system to instruct a registration in the storage area of the information service system.

In the recording medium, the message information of the user may be an absence notification. In the recording medium, moreover, it is also desirable that there is recorded a program that display the words classified by their types.

In the recording medium, identification codes associated with meanings may be assigned to the words, and the words may be displayed in a letter series mode. Furthermore, the message information of the user may be prepared by converting the selected word into the identification codes.

According to another embodiment of the invention, moreover, there is provided a recording medium on which is recorded a program executed by a terminal device for viewing message information of a user. The recording medium may be used in an information service system for allowing viewing of the message information registered in a storage area by the user, in response to an instruction of another user. The program further causes the terminal device to acquire the message information in an identification code series mode, prepared by the user, from the storage area. The program further causes the terminal device to convert the acquired message information into a character code series, and display the converted character code series into a character mode.

In the recording medium, the information service system may record a program for converting the message information of the user in the identification code series mode registered from the terminal device, into the message information of the user in the character code series mode.

According to another embodiment of the invention, there is provided a server for storing message information of a user in a storage area and for allowing viewing of the message information in response to an instruction of another user. The server includes a list that stores a handle name indicating another user who is allowed to view the message information of the user. The server further includes a detector that receives an instruction of viewing demand of the message information of the user to detect the handle name of the other user contained in the instruction. The server further includes a confirming system that confirms whether the detected handle name of the other user is stored in the list. The server further includes an allowing system that allows the terminal device of the other user to view the message information of the user when the confirming system has confirmed that the handle name of the other user is stored in the list.

According to another embodiment of the invention, there is provided an information managing method for a server for storing message information of a user in a storage area and for allowing viewing of the message information in response to an instruction of another user. The method includes receiving an instruction of demanding viewing of the message information of the user and detecting a handle name of another user contained in the instruction indication. The method further includes confirming whether the detected handle name of the other user is stored in a list that stores handle names indicating users who are allowed to view the message information of the user. The method further includes allowing the terminal device of the other user to view the message information of the user when it is confirmed that the handle name of the other user is stored in the list.

According to another embodiment of the invention, there is provided a recording medium on which is recorded a program executed by a server. The server may store message information of a user in a storage area, and may allow viewing of the message information in response to an instruction of another user. The program causes the server to receive an instruction of a viewing demand of the message information and to detect a handle name of the user contained in the instruction. The program further causes the server to confirm whether the detected handle name is stored in a list. The list stores handle names of users who are allowed to view the message information of the user. The program further causes the server to allow the terminal device of the other user to view the message information of the user when it is confirmed that the handle name of the other user is stored in the list.

BRIEF DESCRIPTION OF THE DRAWINGS

FIG. 8 is an explanatory diagram showing the contents of the display screen of the game device according to an aspect of the present invention; and FIG. 9 is an explanatory diagram showing the contents of the display screen of the game device according to an aspect of the present invention.

DESCRIPTION OF THE PREFERRED EMBODIMENT

An embodiment of the present invention will be described in detail with reference to the accompanying drawings.

Figure 1:
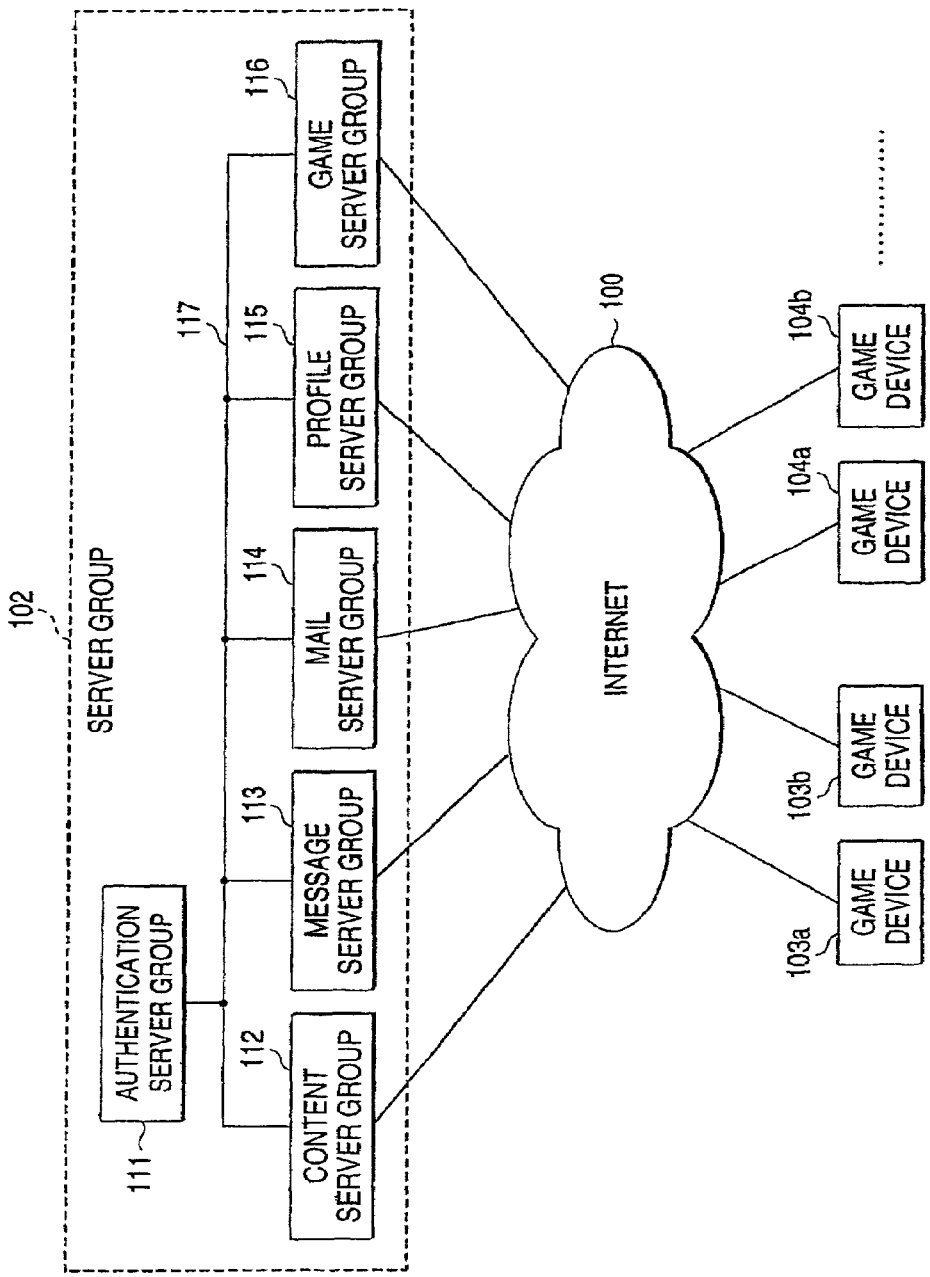
FIG. 1 is a block diagram showing a system construction of an embodiment of the invention.

FIG. 1 shows a system construction of an information service system including a message exchanging server system. In FIG. 1, the information service system includes a communication network 100, and a server group 102 of Information Service Corporation. The information service system further includes clients (or terminal devices), e.g., 103a, 103b, 104a and 104b to be used by users, which clients can be connected with the server group 102 through the communication network 100. The server group 102 and the clients 103a, 103b, 104a and 104b are individual computer systems.

Several types of servers in the server group 102 cooperatively provides various information services. The information service system includes an authentication server (group) 111, a content server (group) 112, a message server (group) 113, a mail server (group) 114, a profile server (group) 115 and a game server (group) 116. The authentication server 111 manages the account (or a log-in ID (identifier)) and the password of a user. Alternatively, the authentication server 111 may manage the connection situation (online/offline) of the user and the address of the client machine of the user who is online.

The content server 112 provides various kinds of information on sports, music, comics, shopping, etc. The message server 113 transfers messages between at least two clients. The mail server 114 provides electronic mail exchanging services between the users.

The game server 116 provides online games. The user plays an online game by starting it in the game server through a viewer. In case the online game is a role playing game (in which the user plays as a game character), the user can play the role playing game with another.

The profile server 115 manages the profile (or user information) corresponding to an account (i e., the so-called "log-in ID") for every user's account. The user can register through the viewer his or her own profile and the handle name to be used in the game and the message exchange with the profile server 115. The profile contains the information indicating whether the client of the user is being connected with the information service system, the information service being used in the information service system, a handle name pre-registered by the user, etc.

The profile contains information that can be viewed only by another specific user. In the present embodiment, this information will be called the "message". The user registers the message from the client. The registered message is stored in a storage area with each log-in ID of the user in a storage device in the profile server.

The user also registers the handle names of the users allowed to view the message. The list of registered handle names of the users will be called the "friend list". The terminal of the user registered in the friend list is serviced with an online notification. This online notification notifies, for example when a user A logs in the information system, the terminal of the user on the friend list registered by the user A, that the user A has logged in. The online notification contains the handle name, and the terminal having received the online notification displays an icon indicating the presence/absence of the log-in and handle name of the user having logged in .

The clients 103a and 103b are home (video) game devices, which can be, for example Play Station 2 (the registered trade name) of Sony Computer Entertainment Inc. The clients 104a and 104b are general-purpose personal computers (as will be called the "PC"). These clients can execute the later-described programs according to the invention by loading them from a recording medium such as CD-ROM. The clients 103a, 103b, 104a and 104b may be generally called just the "clients".

The communication network 100 connects the server group 102 and the aforementioned clients 103a, 103b, 104a and 104b and so on. In the present embodiment, the Internet is supposed as the communication network 100. For transmission/reception of data, there may be used the ordinary protocols such as the TCP/IP (Transmission Control Protocol/Internet Protocol), the HTTP (Hyper-Text Transfer Protocol), the SMTP (Simple Mail Transfer Protocol) or the FTP (File Transfer Protocol).

Figure 2:
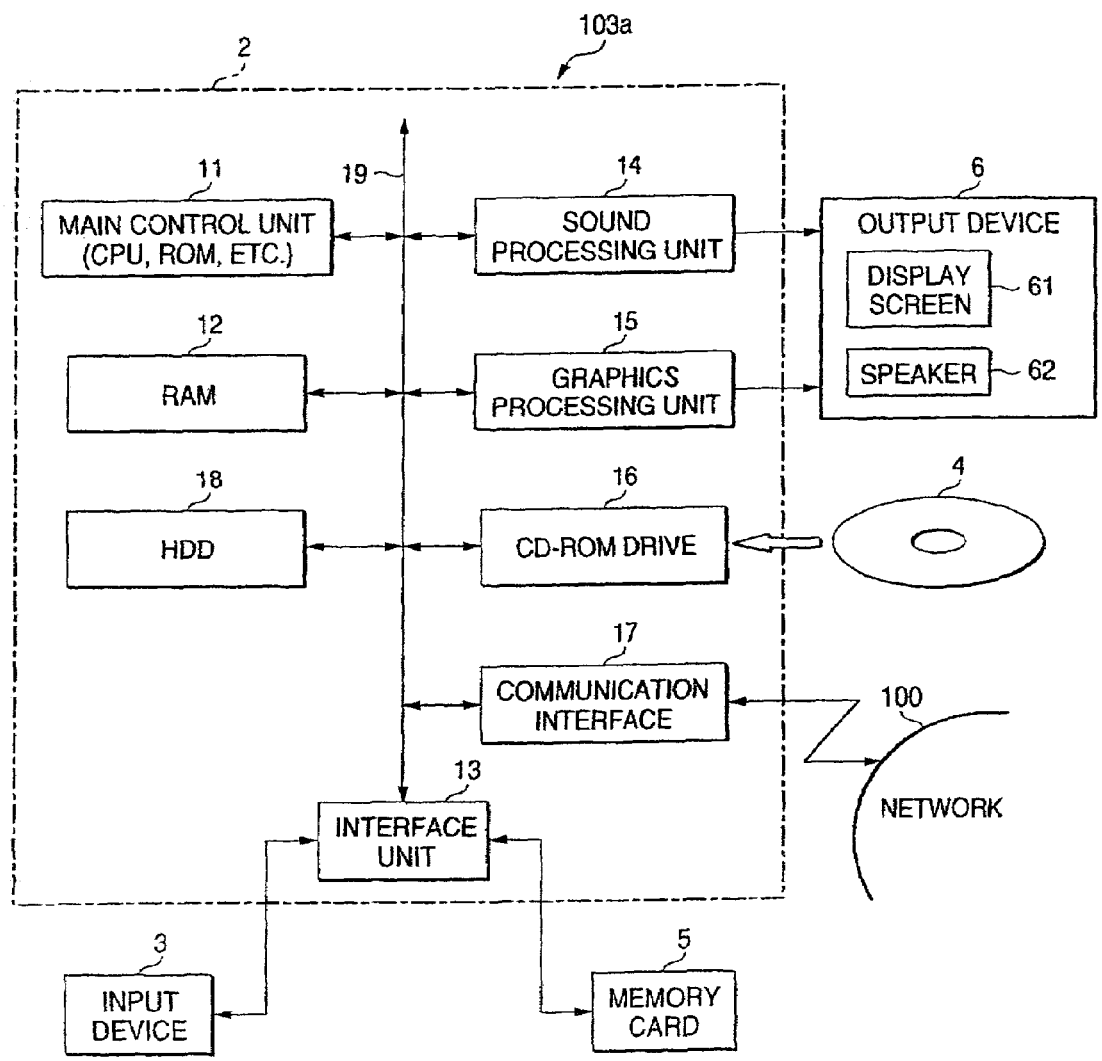
FIG. 2 is a block diagram showing one example of the construction of a game device according to an aspect of the present invention.

In the present embodiment, the client is the home video game device 103a. One example of the construction of the video game device is shown in FIG. 2.

A video game device 103a includes a body 2 including a main control unit 11, a RAM 12, a hard disk drive (HDD) 18, a sound processing unit 14, a graphics processing unit 15, a CD-ROM drive 16, a communication interface 17 and an interface unit 13. The main control unit 11 includes a CPU and a ROM. The CPU controls the system on the basis of a system program stored in the ROM, and executes game software installed on the hard disk by loading it on the RAM 12.

The RAM 12 temporarily stores the data to be input from and output to the CPU. The HDD 18 reads and writes the data to and from the hard disk. The sound processing unit 14 converts acoustic signals in a digital mode into acoustic signals in an analog mode and outputs them to a speaker 62 of an output device 6. The graphics processing unit 15 stores an image to be displayed in the display screen 61 of the display of the output device 6, and provides the image with the display.

The CD-ROM drive 16 is loaded with a CD-ROM 4 and reads out the game software and the related data from the CD-ROM 4 The communication interface 17 communicates with an external device through the Internet 100.

The interface unit 13 inputs various kinds of data for the game from an input device (or a controller) 3, and reads and writes game-associated data in and from a memory card 5.

Figure 4:
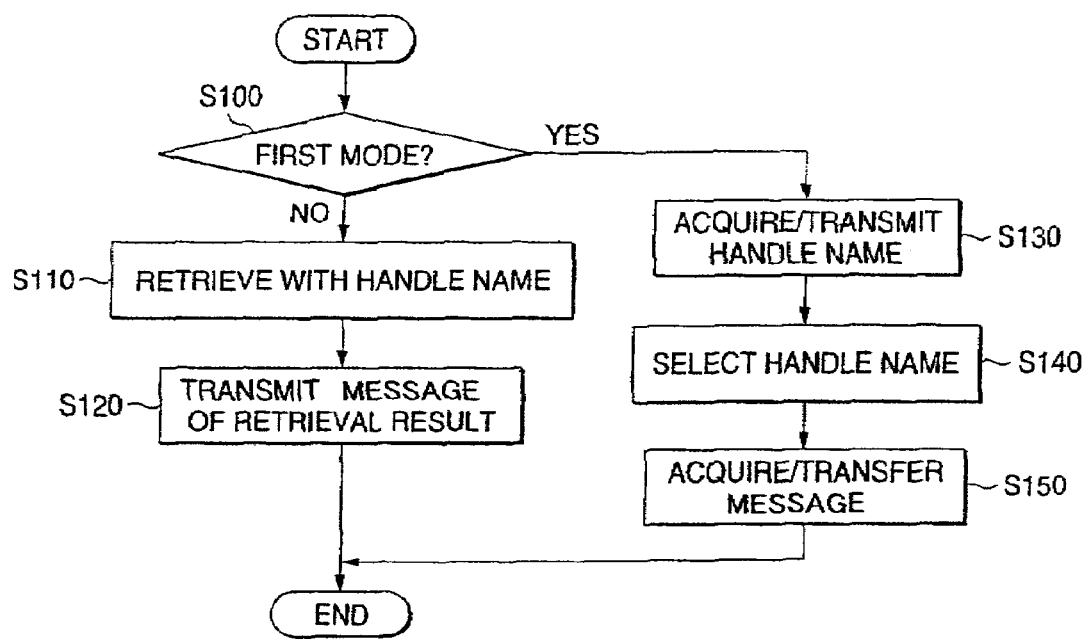
FIG. 4 is a flow chart showing a processing procedure to be executed by the profile server according to an aspect of the present invention.
Figure 5:
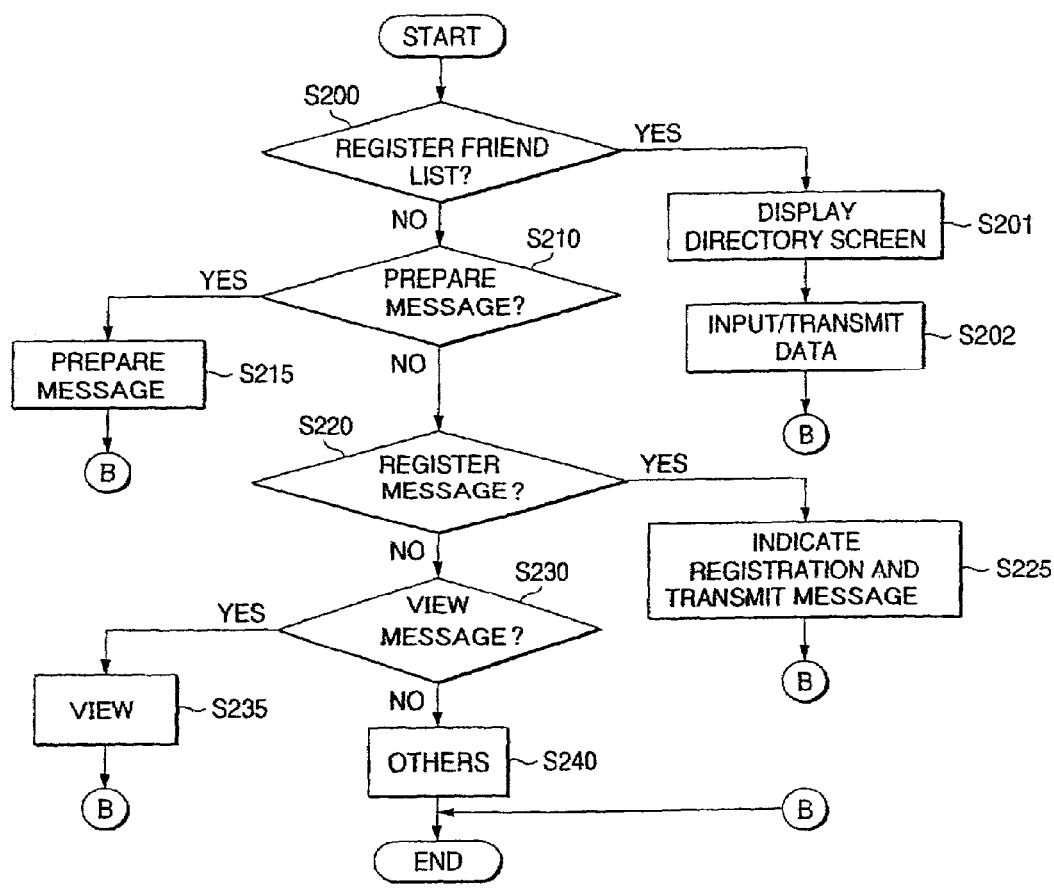
FIG. 5 is a flow chart showing a processing procedure to be executed by the game device according to an aspect of the present invention.
Figure 6:
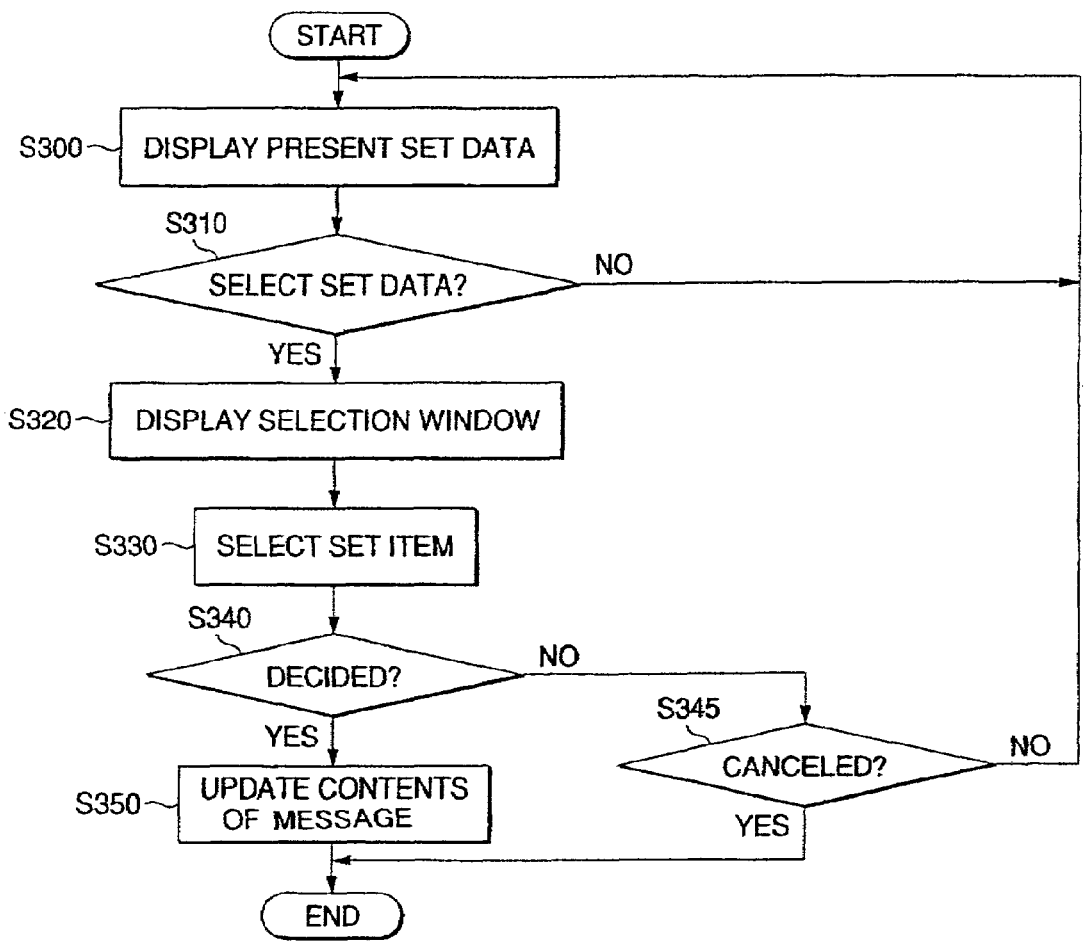
FIG. 6 is a flow chart showing a processing procedure to be executed by the game device according to an aspect of the present invention.

The game device body 2 starts up the viewer to access to the server group 102. A TV receiver outputs image and sound data provided from the game device body 2. The controller inputs an instruction of the user to the game device body 2. The viewer is installed from the CD-ROM 4 in the game device body. In the present embodiment, programs of FIG. 4 to FIG. 6 are incorporated in the viewer and are executed by the CPU in the game device body.

The schematic contents to be processed by the entire system of FIG. 1 according to one embodiment of the invention will be described at first, followed by the contents to be processed by the individual devices.

(Registration of Friend List)

For example, when a game device 103a (referred to as "game device" hereinafter) registers the friend list, a friend list registration menu on the display screen 61 of the display is selected, and the handle name of the user desired to be registered is input by using the input device 3.

Next, the user operates a registration instruction button. Then, data associated with the log-in ID of the user and the friend list are transmitted from the game device to the profile server 115. The profile server 115 registers the received data associated with the friend list, then the handle name to be registered, in an internal dedicated storage area.

(Registration of Message)

The user prepares a message on the display screen. In the present embodiment, there are in advance prepared usable words for individual set items such as "when", "who" or "what", so that the user prepares the message for notifying the absence by selecting from the usable word group displayed on the display screen 61.

By adopting this information processing method, the words, which the user can use, are restricted so that a message other than a specific application, e.g., the absence notification, cannot be prepared. The prepared absence notification and the log-in ID are sent from the game device to the profile server 115 in response to the instruction of registration from the user and are registered in the message storage area of the user.

(Viewing of Message)

In case the user wants to view a message of another, he or she instructs the game device to view the message. There are prepared two kinds of viewing modes. In the first viewing mode, there is displayed a list of the handle names which are registered in the friend list. When the user designates a specific handle name, the message of the designated handle name is provided by the profile server and is displayed in the game device. In the second viewing mode, when the user inputs a specific handle name, the profile server 115 retrieves the message corresponding to the handle name from the message group to provide the retrieved message. The provided message is displayed on the game device.

(Contents Processed by Profile Server 115)

Figure 3:
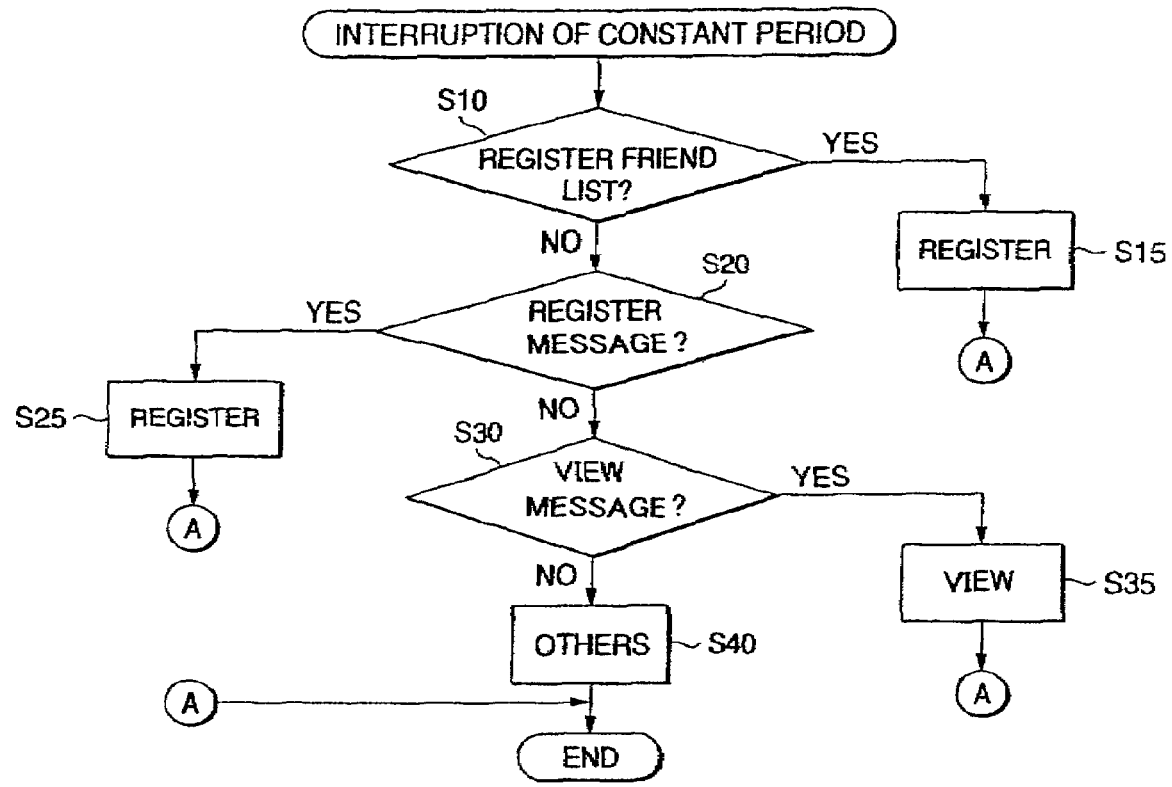
FIG. 3 is a flow chart showing a processing procedure to be executed by a profile server according to an aspect of the present invention.

Here will be described the contents to be processed by the profile server 115 with reference to FIG. 3 and FIG. 4. FIG. 3 and FIG. 4 show a processing routine of the profile server 115. The processing routine is installed on the storage device as a program, and is executed by the CPU in the profile server 115.

In FIG. 3, it is decided at Step S10 whether an instruction of registration of a friend list has been received from the game device. If the profile server 115 receives the instruction of registration of the friend list from the game device, the routine advances from Step S10 to Step S15. At Step S15, the friend list received in response to the registration instruction, i.e., the handle names of the user who are allowed to view the message registered by the user and the information introducing the user, is registered in the memory area (on the hard disk) assigned to the user.

At Step S20, it is decided whether the instruction of registration of the message has been received from the game device. When the profile server 115 receives the registration instruction of the message from the game device, the routine advances to Steps S10→S20→S25, so that the message received in response to the registration instruction is registered in the storage area (on the hard disk) assigned to the user.

At Step S30, it is decided whether an instruction to view the message has been received from the game device. With the viewing instruction of the message from the game device, the routine advances to Steps S10→S20→S30→S35 so that the profile server 115 provides the accessed game device with the message stored in the specific storage area of the user. More specifically, the profile server 115 decides whether the handle name of the user transmitted in response to the viewing instruction has been registered in the friend list of the user having registered the message. If this answer is YES, the profile server provides the message. If the answer is NO, a message denying the viewing is transmitted to the game device. The message viewed in two different viewing modes. In the first viewing mode, the viewing is made from the handle name list, In the second viewing mode, the viewing is made with the handle name. In the instructed mode, the profile server 115 retrieves the message and provides it for the game device. This routine will be described in detail with reference to FIG. 4.

At Step S40, the profile server 115 executes operations other than the aforementioned ones.

FIG. 4 shows the message retrieval in the viewing processing of Step S35 of FIG. 3, in detail.

In FIG. 4, the profile server 115 identifies the type of viewing instruction received, and decides (at Step S100) whether the viewing is in the first mode or in the second mode. If the first viewing mode is instructed, the profile server 115 retrieves the friend list of all users, using the handle name received along with the viewing instruction as a query (or the so-called "keyword"). The profile server 115, thereby, acquires the friend list describing the handle name of the viewer and the handle name of the registrant of the friend list. The handle name thus acquired is sent to the game device having instructed the viewing (at Step S130).

In the game device, there is displayed the list of the handle names sent from the profile server 115, so that the viewing user selects a desired handle name (at Step S140). In response to this selection, the handle name selected from the game device is transmitted to the profile server 115. This profile server 115 reads the message corresponding to the transmitted handle name, from the hard disk and provides it for the game device (at Step S150). The message provided is displayed on the game device.

If it is decided at Step S100 that the second viewing mode is instructed, on the other hand, the profile server 115 advances the routine to Step S110. At Step S110, the profile server 115 accepts, from the game device, the handle name of the user desiring to view the message. Next, the profile server 115 reads out the message corresponding to the accepted handle name, and provides the game device with the read-out message (at Step S120). The provided message is displayed on the game device.

(Contents Processed by Game Device)

Figure 7:
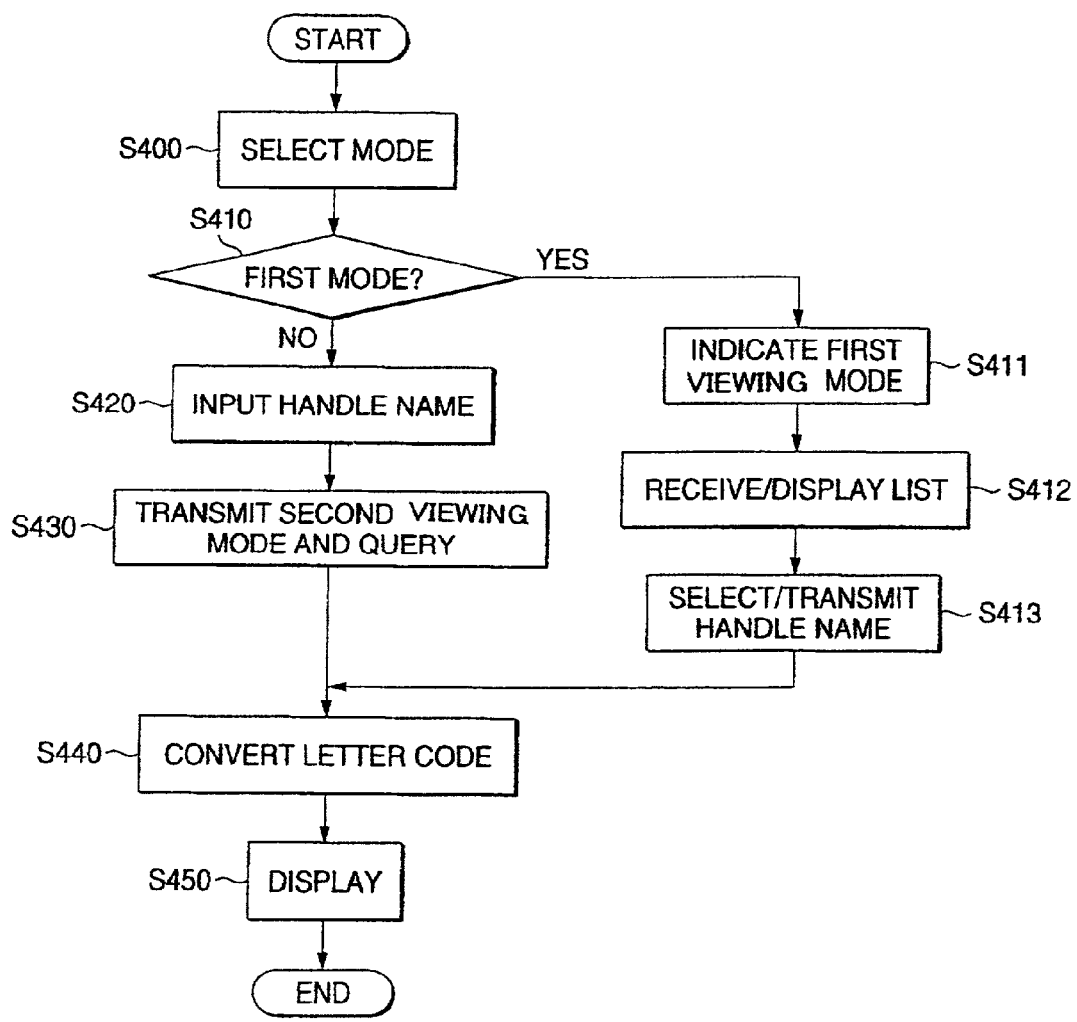
FIG. 7 is a flow chart showing a processing procedure to be executed by the game device according to an aspect of the present invention.

The contents to be processed on the game device are shown in FIG. 5 to FIG. 7. FIG. 5 shows a main processing routine by the game device. FIG. 6 shows a processing routine for preparing the message. FIG. 7 shows a processing routine for displaying the message of another user. These processing routines are installed in the hard disk as programs and are executed by the CPU of the main control unit 11.

In FIG. 5, decisions at Steps S200, S210, S220 and S230 discriminate the kind of the operation instruction which has been input through the input device 3 (as referred to in FIG. 2) by the user. At Step S200, it is decided whether an instruction for registration of the friend list has been input. At Step S210, it is decided whether an instruction for preparation of the message has been input at Step S220. At Step S230, it is decided whether an instruction for viewing of the message has been inputted. At Step S240, it is decided whether an operation instruction other than the aforementioned instructions has been input.

When the registration instruction of the friend list is input, the routine advances to Steps S200→S201, at which a screen for registering the friend list is displayed on the display. The user inputs a user's handle name, which the user wants to register, in the screen for the friend list. The handle name, input through the input device 3, is transmitted from the game device, and is registered in the profile server 115 (at Step S202).

When the preparation of the message is instructed by the user, the routine advances to Steps S200 to S210→S215. At Step 215, the message is prepared and stored in the hard disk. The routine for preparing the message will be described in detail with reference to FIG. 6.

When an instruction for registering of the message is input, the routine advances to Steps S200→S210→S220→S225. In these steps, the message prepared in advance is transmitted along with an instruction for registering the prepared message in the server. When the viewing instruction of the message is input, the routine advances to Steps S200→S210→S220→S230→S235. At Step S235, the viewing of the message is executed. This viewing of the message will be described in detail with reference to FIG. 7.

Other operation instructions are discriminated at Step S240, and the operations corresponding to the instructions are executed.

Prior to the description of the contents for processing the message, a screen for preparing the message will be described.

FIG. 8 shows a window screen, which is displayed when the message preparing menu on the display screen 61 is selected by the user. In FIG. 8, a numeral 1000 indicates a message editing screen. Numeral 1001 indicates the words for messages being set currently, and their kinds (or set items). When the cursor of a pointing device is positioned at the indication 1001 of a set item, there is displayed a pop-up menu for selecting a desired candidate from multiple selection candidates 1011, as indicated in FIG. 9. The user is enabled to display the selection candidates in the pop-up menu 1010 sequentially by moving the scroll bar 1004. When the user designates a desired selection candidate and operates a return button 1012, the indication of the word of the set item of FIG. 8 is replaced by the word of the selected candidate.

Thus, the user decides the words of each set item and operates a decision button 1002. In response to the operation of the decision button 1002, the game device combines multiple set words to prepare the message. Numeral 1003 indicates a cancel button for instructing the return of the changed words to an initial default to end the message preparation. Numeral 1004 indicates a scroll bar for scrolling the indication 1001 of the words and the set items.

On the basis of these points, here will be described the contents of the message preparing routine of the game device.

When the user selects the message preparing menu, there is started the processing routine of FIG. 6. The CPU stores the RAM 12 temporarily with the displaying data stored in the hard disk, and uses the data to display the message editing screen 1000, as shown in FIG. 8, in the display screen 61 (at Step S300). When it is detected at Step S310 that the indication 1001 of the set items and the words is designated by the pointing device (or the input device 3), the display data stored in the hard disk are used by the CPU to display the pop-up menu 1010 of FIG. 9 (at Step S320).

When the word selected in the pop-up menu 1010 by the user is received, the selected word is replaced by the word of the corresponding kind on RAM 12 (at Step S330) in response to the operation of the return button 1012. The word to be stored in the RAM 12 is not character codes but identification codes indicating the meaning of the word. In the present embodiment, considering that the information service system is used in many countries, a common identification code is assigned to a word belonging to different countries but having an identical meaning even if its notations are different, and the character codes indicating the word and the word dictionary describing the identification codes are stored in the hard disk. The word, selected with reference to that word dictionary, is converted into the identification codes and stored in the RAM 12.

Subsequently, the CPU returns the display of the display screen 61 from FIG. 9 to FIG. 8. When a scroll bar 1013 is operated while the display of FIG. 9 is being made, the display is scrolled.

When one word is selected at Step S330, it is then decided (at Step S340) whether the decision button 1002 has been operated, and it is decided (at Step S345) whether the cancel button 1003 has been operated. When none of these buttons is operated, the routine returns to Steps S340→S345→Step S300, and the selection of another word of the user is awaited. When the user executes the operation to select another word, this word selected at Steps S300 to S340 is temporarily stored in the RAM 12.

When the user operates the cancel button 1003, the operation is detected at Step S345 so that the processing routine of FIG. 6 advances from Step S345 to END. Therefore, the message data stored in the hard disk, i.e., the word group thus far set is not changed.

When the user operates the decision button 1002, on the other hand, the operation is detected at Step S340 so that the routine transfers to Step S350. Here, one or more words, which are stored in the RAM 12 and newly selected by the user, and the word, which is not newly selected by the user and left at the previous setting, are combined to prepare the message. Here, the word group on the RAM 12 is held as new set data in the hard disk. The message prepared is transmitted, when an automatic response is instructed, in the mode of an identification code series to the profile server 115 (at Step S350) As a modification of this routine, an automatic response message prepared may be transmitted at a timing of the operation of the decision button 1002 to the profile server 115.

Here will be introduced a specific preparation of the message. As a group of set items 1001 of FIG. 8, for example, there are prepared "what time?", "conjunction?", "who?", "what doing?" and "the last word?".

As sub set items of "what time?", there are prepared "month", "date", "o'clock" and "minute". In the sub set items of "month", there are prepared "1. no set" and "2. 1 to 12". Selection candidates are individually prepared for "date", "o'clock" and "minute".

In the set item of "conjunction?", there are prepared selection candidates of "1. not set", "2. from", "3. to", "4. from around" and "5. to around".

In the set item of "who?", there are prepared selection candidates of "1. no set", "2. I", "3. with family", "4. all together" and "5. with friends".

In the set item of "what doing", there are prepared selection candidates of "1. left seat", "2. absent", "3. reading comics", "4. writing mails", "5. chatting", "6. playing a game" and "7. traveling".

In the set item of "the last word?", there are prepared selection candidates of "1. no set", "2. wait a minute", "3. next time", "4. message can't be replied to soon", "5. contact by mobile telephone", "6. contact to home" and "7. send mail".

When the user selects a desired one of the selection candidates from a first set item, he changes the set items sequentially to select the desired selection candidate.

After these operations, for example, there are prepared the message such as "august, 31", "23 o'clock", "10 minutes", "around", "I", "left seat" and "wait a minute".

The selection candidates displayed on the display screen are in the mode of characters, but the message prepared on the RAM 12 is in the identification codes assigned to the selection candidates. The game device has the word dictionary describing the identification codes and their character code series. When the message of another user on the profile server 115 is to be viewed, therefore, the game device uses the word dictionary to make a display by converting the identification codes into the character code series.

When a user wants to view the message of another, the viewing of the message is instructed on the display screen 61. In response to this instruction, the processing routine of FIG. 7 is started in the game device. The user inputs the viewing mode through the input device 3 (at Step S400).

At Step S410, it is decided whether the input mode is the first viewing mode (in which the handle name is selected from the list of handle names) or the second viewing mode (in which the message is retrieved on the basis of a specific handle name).

In case the first viewing mode is instructed, the game device instructs the first viewing mode to the profile server 115 (at Step S410→S411). The game device receives and displays the viewing list sent from the profile server 115, that is, the list of handle names of the users who allowed the handle name of the user having instructed the viewing to view the message (at Step S412).

When the user selects the desired handle name from the displayed viewing list, the game device transmits the selected handle name to the profile server 115 (at Step S413). The profile server 115 transmits the message corresponding to the selected handle name to the game device.

In case the second viewing mode is instructed, on the other hand, the routine advances from Step S410 to Step S420. At this Step, the user inputs the desired handle name through the input device 3. The input handle name and the instruction of the second viewing mode are sent to the profile server 115 (Step S430). The profile server 115 transmits the message corresponding to the handle name to the game device.

The game device receives the message, which has been received in the processing routine corresponding to the first viewing mode or the second viewing mode, and displays it on the display. The message stored in the profile server 115 is in the mode of the identification code series, as described above, so that the identification code series is converted on the basis of the word dictionary to character code series and is displayed (at Steps S440→S450).

In case the message registered by a Japanese user is read by an American user, for example, the identification code series is converted into an English word series and displayed.

In addition to the embodiment thus far described, the present invention can be practiced in the following modes.

In the aforementioned embodiment, the game device for receiving the message converts the message of the identification code series mode into the message of the character code series mode. However, this conversion may be executed by the profile server 115. In this modification, the message registrant may designate the desired message's language and may notify it to the profile server 115 through the game device. The profile server may store the message of the character code mode, after converted from the message of the identification code mode, and provide it for the viewing of another user, or may convert the message into character codes when provided for the viewing of another user.

The foregoing embodiment has been described on the operations by taking the dedicated game device as an example. As this game device, the present invention can be applied to all electronic devices such as general-purpose personal computers or mobile telephones having the communicating function, the displaying function and the information processing function.

The communication server system for the message exchanges may be one computer or multiple computers.

In the foregoing embodiment, the programs to be executed are stored in the CD-ROM as one example of the recording medium, but may be stored in other recording media such as a DVD-ROM or a ROM card, which can be read by a computer.

The invention could be modified in various manners in addition to the embodiment thus far described, and the modifications are contained in the technical range of the invention so long as they are based on the technical concept defined by claims.

According to the present invention, as has been described hereinbefore, the user cannot use any word other than the words prepared in advance. In the prepared information, therefore, it is impossible to prepare information for slandering or scandalizing others or to prepare information for advertising thereby to provide the information viewing for a specific application such as the message. By classifying information, moreover, the user can reduce the endeavor for looking for a desired word from the pieces of information.

By converting the prepared information into the mode of identification codes and by converting the identification codes into character codes of the language used by the user for displaying the information, according to the present invention, the information can be transmitted between the users using different languages.

What is claimed is:

1. A first networked game terminal client device, comprising:
    a storage that stores a first dictionary which associates identification codes with each of a limited set of preset words in a character series of a first natural language;
    a display that displays a plurality of the preset words in the character series of the first natural language;
    a selecting system that allows a user to select at least one of a word and a phrase from the limited set of preset words from a plurality of predetermined categories;
    a processor that prepares message information to be registered at a server storage area of an information service system which provides networked gaming services for the first networked game terminal client device and a second networked game terminal client device, the processor preparing the message information by combining and converting the at least one of the word and the phrase selected in the character series of the first natural language into identification codes for the at least one of the word and the phrase based upon the first dictionary; and
    a message information transmitter that transmits the message information to the information service system, so that the second networked game terminal client device can obtain the message information from the information service system and display the at least one of the word and the phrase of the message information in a character series of a second natural language, which differs from the first natural language, when the identification codes for the at least one of the word and the phrase are converted into the character series of the second natural language based upon a second dictionary at the second networked game terminal client device,
    wherein the registered message information is only accessible to a predetermined group of users, selected by the user, wherein the processor prepares the registered message information by receiving the at least one of the word and the phrase, from the plurality of predetermined categories, and wherein the selecting system limits selection of the at least one of the word and the phrase to the limited set of preset words and the message information prepared by the processor is uneditable for regulating a content of the message information based on the limited set of preset words.

2. The terminal device according to claim 1, wherein the message information comprises a notification of absence of a user of the first networked game terminal client device.

3. The terminal device according to claim 1, wherein the preset words are classified by type and displayed according to classification of type.

4. A second networked game terminal client device, comprising:

a storage that stores a second dictionary which associates identification codes with each of a limited set of preset words in a character series of a second natural language;

an obtaining system that obtains, from an information service system which provides networked gaming services for the second networked game terminal client device and a first networked game terminal client device, message information registered at a server storage area of the information service system;

a processor that converts identification codes of the message information into selected words of the limited set of preset words in the character series of the second natural language based upon the second dictionary, the message information having been prepared at the first networked game terminal client device by converting at least one of a word and a phrase selected at the first networked game terminal client device in a character series of a first natural language, which differs from the second natural language, into the identification codes of the message information based upon a first dictionary at the first networked game terminal client device; and a display that displays the at least one of the word and the phrase in the character series of the second natural language, wherein the registered message information is only accessible to a predetermined group of users, selected by a user, wherein a processor prepares the registered message information by receiving words, selected by the user, from a plurality of predetermined categories, and wherein the at least one of the word and the phrase selected at the first networked game terminal client device is limited to a limited set of preset words in the character series of the first natural language and the message information prepared by the processor is uneditable for regulating a content of the message information based on the limited set of preset words in the character series of the first natural language.

5. An information messaging method, comprising:

storing a first dictionary which associates identification codes with each of a limited set of preset words in a character series of a first natural language at a storage of a first networked game terminal client device;

displaying a plurality of the preset words stored in the character series of the first natural language at a display of the first networked game terminal client device;

selecting at least one of a word and a phrase from the preset words stored in the character series of the first natural language and displayed at the display of the first networked game terminal client device;

preparing message information to be registered at a server storage area of an information service system which provides networked gaming services for the first networked game terminal client device and a second networked game terminal client device, the message information being prepared by combining and converting the at least one of the word and the phrase selected in the character series of the first natural language into identification codes for the at least one of the word and the phrase based upon the first dictionary; and transmitting the message information to the information service system, so that the second networked game terminal client device can obtain the message information from the information service system and display of the message information in a character series of a second natural language, which differs from the first natural language, when the identification codes for at least one of the word and the phrase are converted into the character series of the second natural language based upon a second dictionary at the second networked game terminal client device, wherein the registered message information is only accessible to a predetermined group of users, selected by a user, wherein a processor prepares the registered message information by receiving the at least one of the word and the phrase, selected by the user, from a plurality of predetermined categories, and wherein the selecting is limited to selecting the at least one of the word and the phrase from the limited set of preset words and the message information prepared by the processor is uneditable for regulating a content of the message information based on the limited set of preset words.

6. The method according to claim 5, wherein the message information comprises a notification of absence of a user of the first networked game terminal client device.

7. The method according to claim 5, wherein the preset words are classified by type and displayed according to classification of type.

8. An information messaging method, comprising:

storing a second dictionary which associates identification codes with each of a limited set of preset words in a character series of a second natural language at a storage of a second networked game terminal client device;

obtaining, from an information service system which provides networked gaming services for the second networked game terminal client device and a first networked game terminal client device, message information registered at a server storage area of the information service system;

converting identification codes of the message information into selected words of the limited set of preset words in the character series of the second natural language based upon the second dictionary, the message information having been prepared at the first networked game terminal client device by converting at least one of a word and phrase selected at the first networked game terminal client device in a character series of a first natural language, which differs from the second natural language, into the identification codes of the message information based upon a first dictionary at the first networked game terminal client device; and displaying the selected words in the character series of the second natural language at a display of the second networked game terminal client device, wherein the registered message information is only accessible to a predetermined group of users, selected by a user, wherein a processor prepares the registered message information by receiving the at least one of the word and phrase, selected by the user, from a plurality of predetermined categories, and wherein the at least one of the word and the phrase selected at the first networked game terminal client device is limited to a limited set of preset words in the character series of the first natural language and the message information prepared by the processor is uneditable for regulating a content of the message information based on the limited set of preset words in the character series of the first natural language.

9. The method according to claim 8, wherein the information service system converts the identification codes of the message information registered from the first networked game terminal client device, into the character series of the second natural language.

10. A recording medium on which is recorded a program executed by a first networked game terminal client device for information messaging, the program causing the first networked game terminal client device to execute:

storing a first dictionary which associates identification codes with each of a limited set of preset words in a character series of a first natural language at a storage of the first networked game terminal client device;

displaying a plurality of the preset words stored in the character series of the first natural language at a display of the first networked game terminal client device;

selecting at least one of a word and a phrase from the preset words stored in the character series of the first natural language and displayed at the display of the first networked game terminal client device;

preparing message information to be registered at a server storage area of an information service system which provides networked gaming services for the first networked game terminal client device and a second networked game terminal client device, the message information being prepared by combining and converting the at least one of the word and the phrase selected in the character series of the first natural language into identification codes for the at least one of the word and the phrase based upon the first dictionary; and transmitting the message information to the information service system, so that the second networked game terminal client device can obtain the message information from the information service system and display of the message information in a character series of a second natural language, which differs from the first natural language, when the identification codes for the at least one of the word and the phrase are converted into the character series of the second natural language based upon a second dictionary at the second networked game terminal client device, wherein the registered message information is only accessible to a predetermined group of users, selected by a user, wherein a processor prepares the registered message information by receiving the at least one of the word and the phrase, selected by the user, from a plurality of predetermined categories, and wherein the selecting is limited to selecting the at least one of the word and the phrase from the limited set of preset words and the message information prepared by the processor is uneditable for regulating a content of the message information based on the limited set of preset words.

11. The recording medium according to claim 10, wherein the message information comprises a notification of absence of a user of the first networked game terminal client device.

12. The recording medium according to claim 10, wherein the preset words are classified by type and displayed according to classification of type.

13. A recording medium on which is recorded a program executed by a second networked game terminal client device for information messaging, the program causing the second networked game terminal client device to execute:

storing a second dictionary which associates identification codes with each of a limited set of preset words in a character series of a second natural language at a storage of the second networked game terminal client device;

obtaining, from an information service system which provides networked gaming services for the second networked game terminal client device and a first networked game terminal client device, message information registered at a server storage area of the information service system;

converting identification codes of the message information into selected words of the limited set of preset words in the character series of the second natural language based upon the second dictionary, the message information having been prepared at the first networked game terminal client device by converting at least one of a word and phrase selected at the first networked game terminal client device in a character series of a first natural language, which differs from the second natural language, into the identification codes of the message information based upon a first dictionary at the first networked game terminal client device; and displaying the selected words in the character series of the second natural language, wherein the registered message information is only accessible to a predetermined group of users, selected by a user, wherein a processor prepares the registered message information by receiving the at least one of the word and phrase, selected by the user, from a plurality of predetermined categories, and wherein the at least one of the word and the phrase selected at the first networked game terminal client device is limited to a limited set of preset words in the character series of the first natural language and the message information prepared by the processor is uneditable for regulating a content of the message information based on the limited set of preset words in the character series of the first natural language.

14. The recording medium according to claim 13, wherein the information service system has recorded programs for converting the identification codes of the message information registered from the first networked game terminal client device, into the character series of the second natural language.

* * * * *